United States Patent [19]

Stoffels et al.

[11] 4,292,867
[45] Oct. 6, 1981

[54] APPARATUS AND METHOD FOR SLITTING ELONGATED ROLLS OF MATERIAL

[75] Inventors: Carl A. Stoffels, Flemington; Nicholas J. Genovese, Union, both of N.J.

[73] Assignee: Judelshon Industries Division, John Dusenbery Co., Inc., Randolph, N.J.

[21] Appl. No.: 91,697

[22] Filed: Nov. 6, 1979

[51] Int. Cl.³ .......................... B23B 1/00; B23B 7/00; B23B 3/04
[52] U.S. Cl. ........................................ 82/47; 82/48; 82/83; 82/98; 82/101
[58] Field of Search .................. 82/46, 46 A, 47, 48, 82/83, 91, 86, 98, 101

[56] References Cited

U.S. PATENT DOCUMENTS

| | | | |
|---|---|---|---|
| 385,201 | 6/1888 | Remus | 82/46.1 |
| 2,015,877 | 10/1935 | Thompson | 82/46.1 |
| 3,083,601 | 4/1963 | Leiss et al. | 82/48 |
| 3,218,894 | 11/1965 | Ho Chow | 82/101 |
| 3,266,350 | 8/1966 | Best | 82/47 |
| 3,299,754 | 1/1967 | Steingass et al. | 82/98 |
| 3,748,934 | 7/1973 | Lezberg | 82/48 |
| 3,933,063 | 1/1976 | Stoffels | 82/48 |
| 4,052,822 | 10/1977 | Obear | 82/98 |

FOREIGN PATENT DOCUMENTS

553524  5/1943  United Kingdom ................ 82/46.1

*Primary Examiner*—Harrison L. Hinson
*Attorney, Agent, or Firm*—Amster, Rothstein & Engelberg

[57] ABSTRACT

The present invention relates to a machine and method for slitting elongated rolls of web material rolled upon a tubular core utilizing a circular double edged knife blade in combination with a circular saw blade. Both blades are rotatably mounted within a rigid common carriage. The carriage is mounted for movement parallel to the axis of the elongated roll to a plurality of cutting locations along the length of the roll and for movement in a cutting stroke perpendicular to the axis of the elongated roll. The machine and method of the present invention may also utilize a separate knife blade to cut the core of the roll.

25 Claims, 8 Drawing Figures

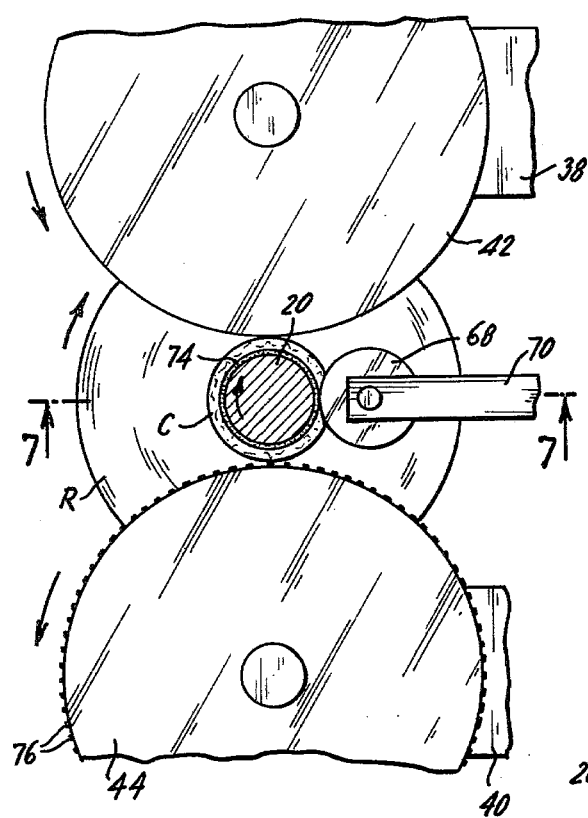
FIG. 6.
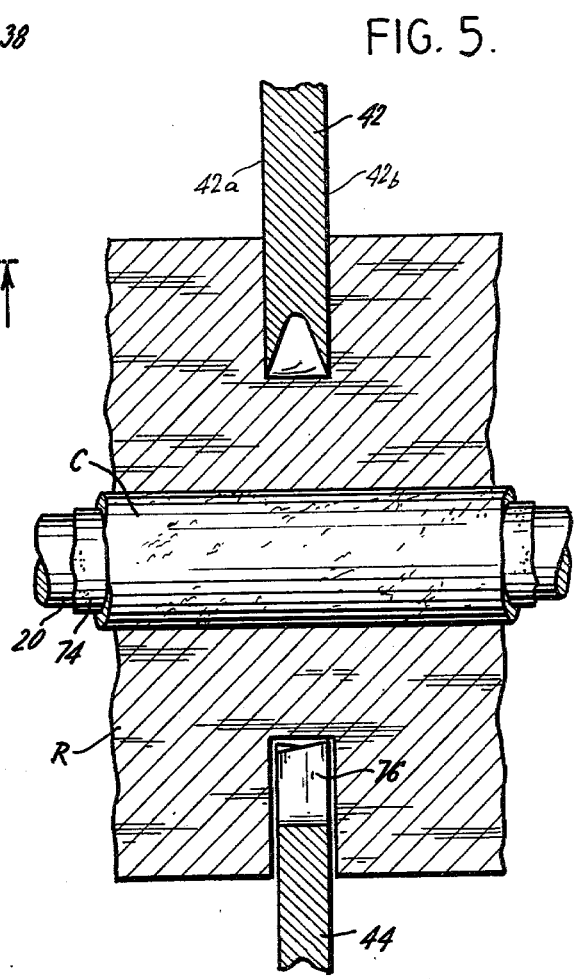
FIG. 5.
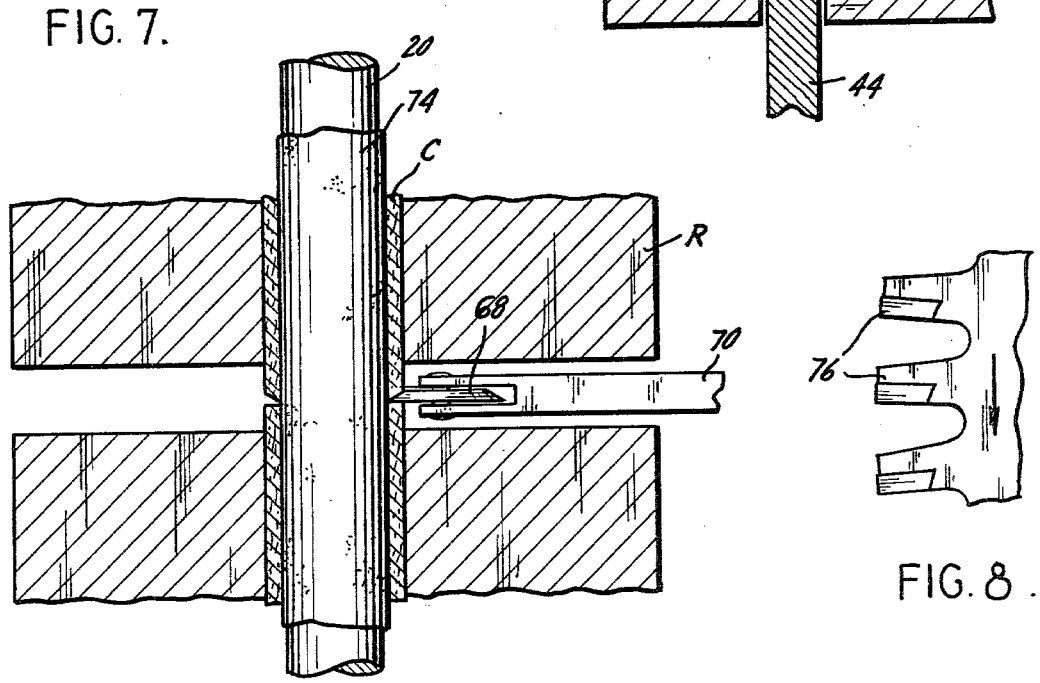
FIG. 7.
FIG. 8.

APPARATUS AND METHOD FOR SLITTING ELONGATED ROLLS OF MATERIAL

The present invention relates generally to double rotary blade cutting machines which are adapted to slit elongated rolls of web material rolled upon a tubular core into narrower rolls or thin strips, and in particular to mechanisms for cutting dense rolls of material, such as polyethylene, other plastic films, and paper, as well as less dense materials, such as fabric.

Rotary blade cutting machines typically include a frame which contains a longitudinally extending stationary shaft or mandrel which receives and supports a roll of material having a tubular core. The roll of material is rotated about the axis of the longitudinal shaft by means of a chuck which engages one end of the roll and is driven from an appropriate variable high speed drive. High speed rotary blades are mounted on a carrier assembly which is movable toward and away from the stationary supporting shaft. The carrier assembly in turn is mounted on the movable carriage which has an indexing mechanism selectively engagable with the frame of the cutting machine such that the carriage may be moved step-wise parallel to the axis of the supporting shaft for moving the carrier and the rotary blade into successive indexed cutting positions along the length of the machine toward the chucked end of the roll of material. After each step-wise advance of the carriage, the carrier assembly is actuated, either automatically or manually, to move the blade inwardly toward the stationary supporting shaft such that the blade moves in a cutting plane substantially at right angles to the longitudinal shaft axis and shears transversely through the roll of material and its core to sever the roll of material into tapes or ribbons.

Early rotary knife cutting machines utilized a single rotary knife or saw blade to sever the roll. Later rotary blade cutting machines employed two blades. A rotary sawing blade was used to make a rough cut through the web material and through the core and a trimming knife to provide relatively smooth cut end faces defining the opposite sides of the strips or ribbons.

Improved rotary knife cutting machines such as the type disclosed in U.S. Pat. Nos. 3,752,024 utilize mechanisms which provide simultaneous sawing and trimming operations. The machine of U.S. Pat. No. 3,752,024 has two blade carrying arms and linkages for rotating the knife blade and saw blade into simultaneous engagement with the roll of web material. As a result of such construction, it is necessary to constantly reset the linkages in order for the machine to consistently operate properly. Additionally, mounting the knife blade and saw blade on arms which are movable relative to each other results in a greater likelihood of vibration and resultant nonalignment between the blades.

As such systems get older and the synchronizing linkages become worn, these problems often become so severe that it is difficult to control the respective amounts of entry of the knife blade and the saw blade into the roll of web material and consequently it is not possible to precisely control whether the knife blade or the saw blade will lead the cut through the web material.

Conventional machines utilize either or both of the rotating blades to sever the tubular core. Typically, tubular core material is made of cardboard which is more abrasive than the web material rolled upon the core. Thus, the blades are quickly dulled as a result of cutting the core material. Further, in many applications, the web material that has been removed by the cutting action of the blades could be recycled and used to manufacture additional web material. However, in conventional machines utilizing the saw blade to sever the core as well as the web material, cardboard dust and chips resulting from the sawing operation on the cardboard core contaminate the web material making it unsuited for recycling.

Conventional machines often produce a significant amount of heat during the slitting operation due to the high rate of rotation of the blade or blades relative to the speed of rotation of the roll of web material. When web material is fusible, heat often causes an undesirable amount of fusing of the material adjacent the end faces of the tapes or ribbon.

Broadly, it is an object of the present invention to provide an improved apparatus and method for slitting rolls of web material which obviate one or more of the aforesaid difficulties. Specifically, it is within the contemplation of the present invention to provide an apparatus and method utilizing a double-edge knife blade and a circular saw blade, mounted in a common cutting plane, on a rigid carriage. Both blades simultaneously act upon the elongated roll of web material to slit the material into tapes or ribbons and the center distance between the blades remains constant during the cutting stroke.

It is a further object of the present invention to provide an apparatus and method for cutting the tubular core with a separate, non-contaminating core cutter mounted on the same carriage as the rotating knife and saw blades.

It is a still further object of the present invention to provide a rotating knife blade that is driven at the surface speed of the rotating roll of web material thereby minimizing the amount of heat generated by the cutting operation and reducing the tendency to fuse the cut end faces of the tapes or ribbons.

In accordance with an illustrative embodiment demonstrating objects and features of the present invention, there is provided a machine for slitting elongated rolls of web material rolled upon a tubular core comprising a supporting frame, a roll engagement means and means for rotating the roll engagement means mounted at one end of the frame and adapted to engage one end of a roll of web material for rotation. The axis of the roll engagement means is coaxial to the axis of the tubular core and defines the machine axis. A slitting assembly is provided comprising a carriage mounted for movement parallel to the axis of the machine to a plurality of cutting locations along the length of the roll and mounted for further movement in a substantially linear cutting stroke transverse to the axis of the machine. A circular knife blade and a circular saw blade are each mounted for rotation in the carriage in a common plane perpendicular to the machine axis. There are motor means for rotating the circular saw. The carriage includes transporting means for moving it through the cutting stroke from a rest position in which the circular blades are spaced away from the roll of material to a core position where the circular blades are adjacent to the core of the material. Control means are provided for coordinating the movement of slitting assembly.

The present invention also provides a method of slitting elongated rolls of web material rolled upon a tubular core comprising the steps of rotating a web of material rolled upon a tubular core about an axis of the core. A groove is formed in the web of material transverse to the axis of the core substantially through the entire radial extent of the web material on the core by a first cutting means. Next, the core is cut through by use of a second cutting means different from the first cutting means.

The above brief description, as well as further objects, features and advantages of the present invention will be more fully appreciated by reference to the following detailed description of the presently preferred, illustrative embodiment according to the present invention, when taken in conjunction with the accompanying drawings, wherein:

FIG. 5 is a sectional view taken substantially along the line 5—5 of FIG. 4 in the direction of the arrows showing the concurrent cutting and sawing action of the respective blades;

FIG. 6 is an end elevational view similar to FIG. 4 showing the cutting of sawing blades in their core position and the engagement of the core cutting means with the core;

FIG. 7 is a sectional view taken substantially along the line 7—7 in FIG. 6 in the direction of the arrows, to show the core cutting action; and, FIG. 8 is a fragmentary view in much larger scale showing the details of the teeth of the saw blade in accordance with the present invention.

Figure 1:
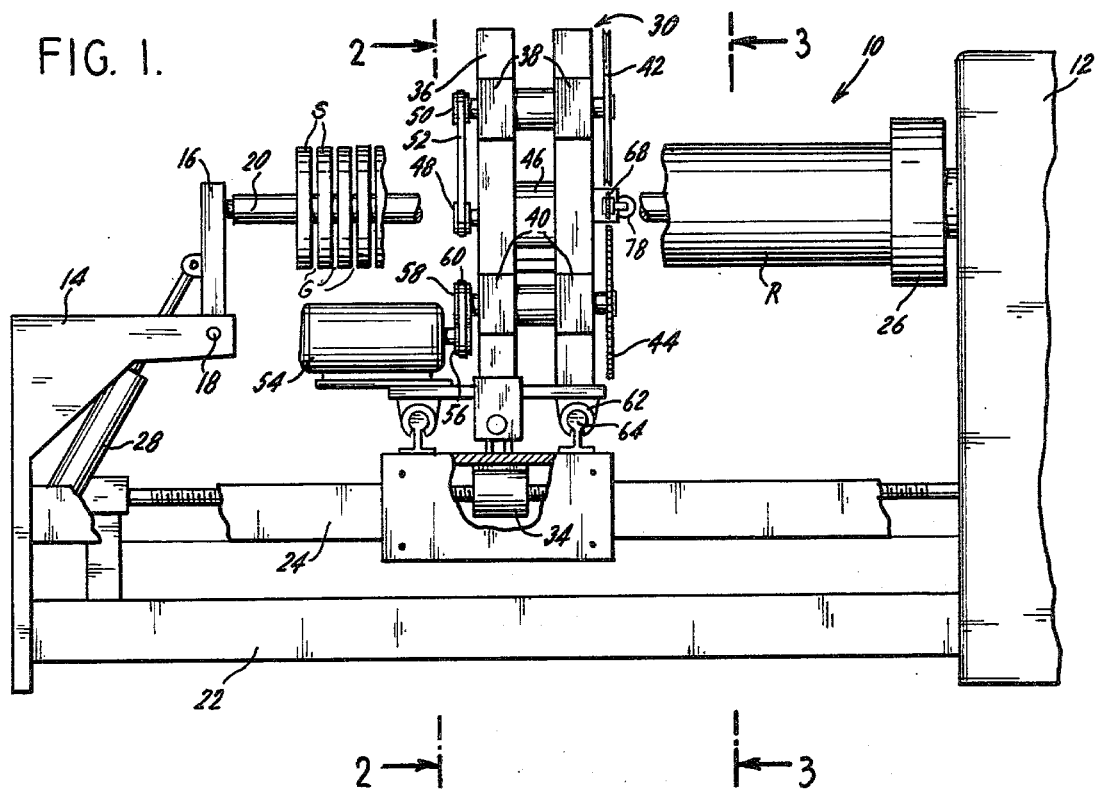
FIG. 1 is a side elevational view, with portions cut away, of the improved double-blade slitting machine of the present invention.

Referring now to the drawings and specifically to FIG. 1, there is provided a double rotary blade cutting machine in accordance with the present invention generally designated by the reference numeral 10. The machine includes a frame or support 11 having an upright housing 12 at one end thereof and a standard 14 at the other end. Housing 12 and standard 14 are rigidly connected by longitudinally extending boxbeams 22, 22 and side rails 24, 24. An end support arm 16 rotatable about pivot 18 between a first upright position as shown in FIG. 1 and a second release position (not shown) is mounted on standard 14. A longitudinally extending stationary supporting shaft or mandrel 20 extends from upright housing 12 and is supported at its opposite end by end support arm 16 as is well known for slitting machines adapted to slit rolls of relatively wide material. The axis of the stationary supporting shaft 20 is coaxial to the axis of a chuck 26 which defines the machine axis.

Supporting shaft 20 is adapted to receive a roll R of web material wound on a tubular core C, which is typically made of cardboard (see FIG. 5). Roll R is adapted to be cut into plural strips or ribbons S of a desired width on a manual or automatic basis.

Roll R is installed over the supporting shaft 20 by rotating end support arm 16 to its released position and sliding roll R over supporting shaft 20. The first end of the roll of material R is brought into engagement with a roll engagement means such as a chuck 26 which is of the conventional type including a number of roll-penetrating elements which may be engaged into the outer periphery of the roll R for affixing same, with one end thereof against the adjacent end face of the chuck 26. The roll engagement means can also be of the expanding mandrel type including a portion that expands within tubular core C to engage the roll R. Once the roll R is fully engaged within the chuck 26 end support arm 16 is caused to assume its upright position as shown in FIG. 1 by the extension of mounting cylinder 28. Means for rotating chuck 26 and the attached roll R relative to the fixed supporting shaft 20 are contained within housing 12 along with control means for coordinating the operation of the various elements of the machine.

Machine 10 includes an improved knife and saw blade slitting assembly generally designated by the reference numeral 30 which is mounted within machine 10 on side rails 24, 24 for longitudinal movement parallel to the machine axis. Slitting assembly 30 moves along side rails 24 on bearings 32 or similar low function devices (best shown in FIG. 2) responsive to the rotation of a power lead screw assembly 34 for automatic or manual indexing to slitting positions along the machine axis. The lead screw 34a extends from the housing 12 to a bearing assembly 34b at the opposite end of the machine 10. The lead screw 34a is driven by appropriate means in the housing 12 to position and maintain the slitting assembly 30 at selected slitting locations along the length of the machine 10.

Figure 2:
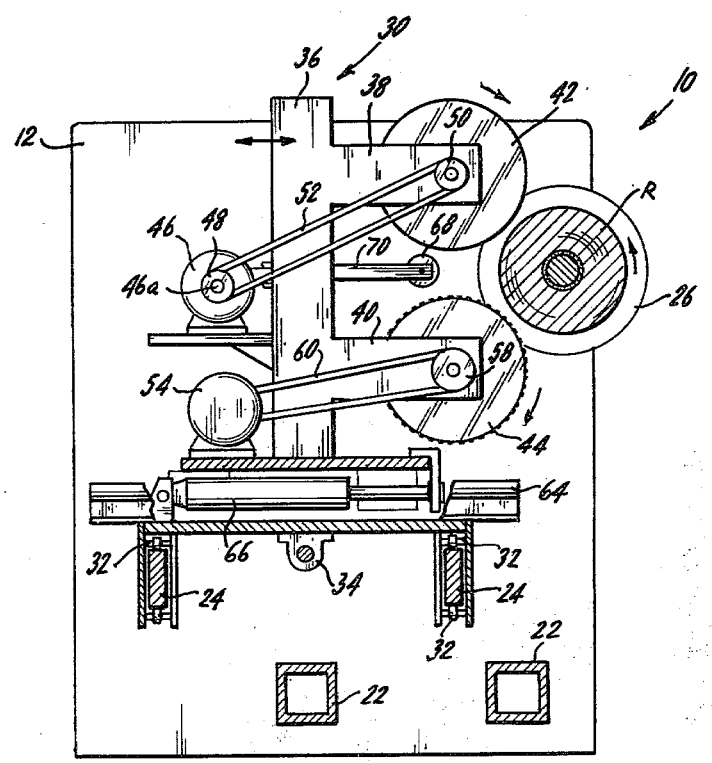
FIG. 2 is a sectional view taken substantially along the line 2—2 of FIG. 1 in the direction of the arrows, showing details of the slitting mechanism.

As best shown in FIG. 2 the slitting assembly contains a knife and saw carriage 36 which is formed from a weldment or similar rigid structure and includes upper and lower support arms 38 and 40, respectively. A circular, double edged knife blade 42 is rotatably mounted to upper support arm 38 and a circular saw blade 44 is rotatably mounted to lower support arm 40. Both knife blade 42 and saw blade 44 rotate in a common cutting plane perpendicular to the machine axis. As will be more fully described below, during the initial portion of the cutting stroke of machine 10, knife blade 42 may be caused to rotate at approximately the same circumferential speed as the outer surface of roll R by variable speed knife motor 46 mounted on carriage 36. Drive shaft 46a of knife motor 46 is coupled to knife blade 42 by a belt and pulley coupling, including pulley 48 on motor shaft 46a, pulley 50 on knife blade 42 and belt 52 trained over pulleys 48, 50. The belt and pulley coupling is arranged to achieve the required speed of rotation of knife blade 42 relative to the speed of rotation of roll R.

Saw blade 44 is caused to rotate independent of knife blade 42 by second variable speed saw motor 54 which is mounted on an appropriate support provided by carriage 36. Drive shaft 54a of saw motor 54 is coupled to saw blade 44 by a belt and pulley coupling, including the pulley 56 on motor shaft 54a, the pulley 58 on saw blade 44 and the belt 60 trained over pulleys 56, 58. The belt and pulley coupling is arranged to rotate saw blade 44 at a circumferential speed which is equal to or greater than the circumferential speed of the roll R at the point of contact between saw blade 44 and roll R throughout the entire cutting stroke. During the cutting stroke since as the uncut radius of roll R decreases, the circumferential speed at that point will otherwise decrease, it is possible to either lower the speed of rotation of saw blade 44 or increase the speed of rotation of roll R to maintain substantially the same speed differential. Reducing the speed of rotation of saw blade 44 will reduce the amount of heat created during the sawing operation thereby minimizing the likelihood of fusing of the material adjacent the end faces of tapes or ribbons S.

As shown in FIG. 2 both knife blade 42 and saw blade 44 rotate in one direction and roll R in the opposite direction.

Figure 3:
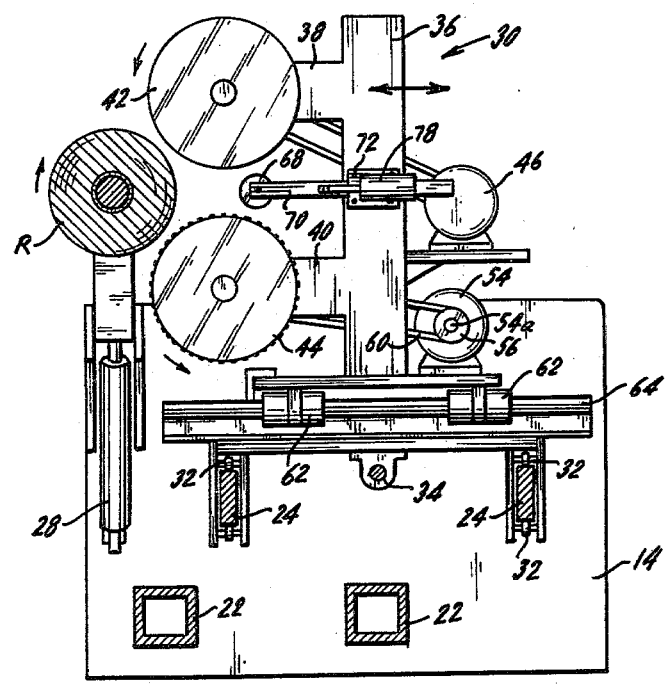
FIG. 3 is a sectional view taken substantially along the line 3—3 of FIG. 1 in the direction of the arrows, showing additional details of the slitting mechanism.

Carriage 36 is mounted within slitting assembly 30 for movement perpendicular to the machine axis during a cutting stroke. As shown in FIG. 3, bushings 62, 62 support carriage 36 on a pair of transversely extending rails 64, 64. Carriage transporting cylinder 66 (FIG. 2) causes carriage 36 to move through the cutting stroke. Carriage 36 is shown in the rest position in FIGS. 2 and 3. During the cutting stroke carriage 36 moves towards the left in FIG. 2 (or the right in FIG. 3). The carriage is moved away from roll R at the completion of the cutting stroke and for loading and unloading of roll R by reversing the porting of carriage transporting cylinder 66.

Slitting assembly 30 of the present invention includes a separate core cutting blade 68. Typically, the core C of roll R is made of cardboard which is significantly more abrasive than the web material on roll R. Therefore, the present invention utilizes a separate core cutting blade 68 which is readily removable or replaceable. Core cutting blade 68 is rotatably mounted at the end of core blade holder 70 which, in turn, is fastened to carriage 36 by a bolted mounting plate 72. As more fully described below, core blade holder 70 is fastened to carriage 36 in a position such that the cutting edge of core cutting blade 68 will engage and penetrate core C of roll R when carriage 36 reaches the end of its cutting stroke. Core cutting blade 68 is mounted to carriage 36 at a height such that the central axis of core cutting blade 68 moves on a line that intersects the machine axis. Alternatively, as shown in FIG. 3, it is possible to mount core blade holder 70 in a manner that is movable relative to carriage 46 whereby a core blade additional cylinder 78 is utilized to provide a further thrust of core cutting blade 68 at the completion of the cutting stroke and to assure that core cutting blade 68 assumes the core cutting position. As best shown in FIG. 1 core cutting blade 68 rotates in a plane substantially common with the plane of rotation of the knife and saw blades 42, 44.

Figure 4:
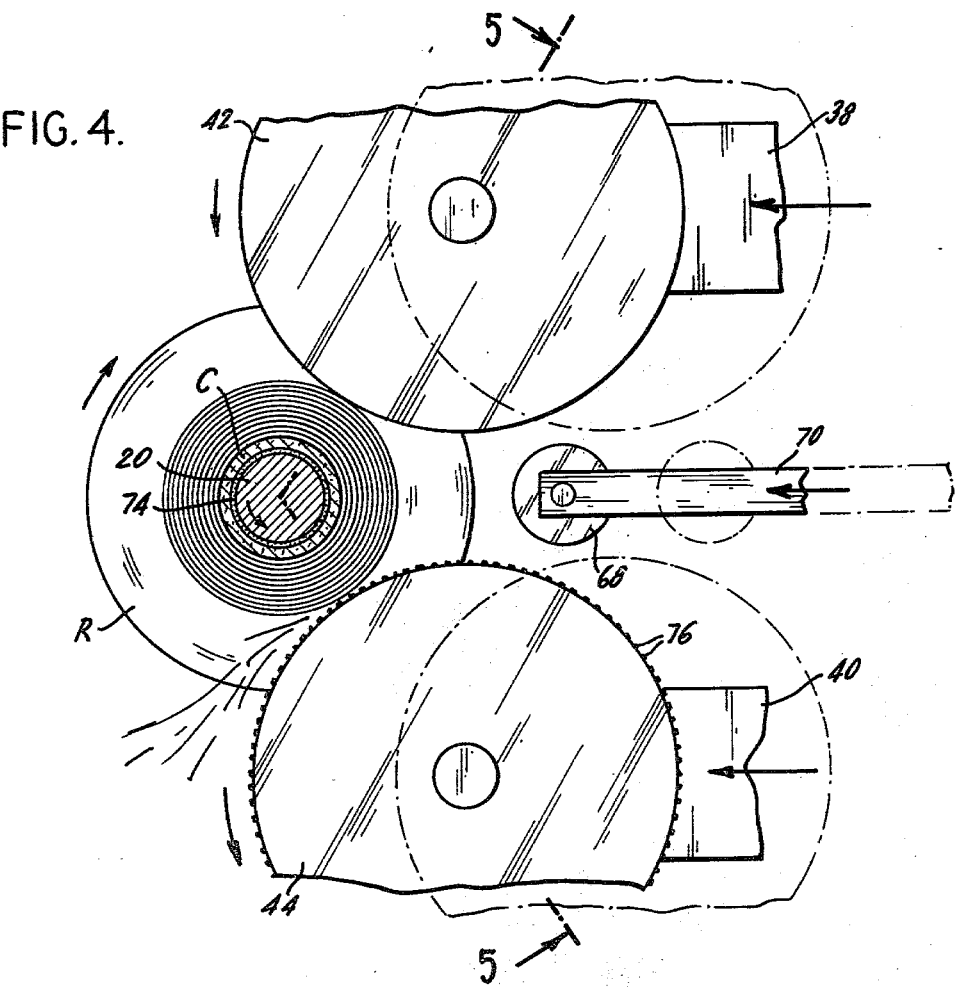
FIG. 4 is an end elevational view of a portion of the cutting mechanism on a somewhat larger scale and with a portion of the web roll in partial section.

Referring to FIG. 4, the phantom lines show the orientation of knife and saw blades 42, 44 when the carriage 36 is in the rest position while the solid lines show the orientation of the blades during the middle of the cutting stroke.

By virtue of the one piece construction of the knife and saw carriage 36, the center to center distancess between knife blade 42 and saw blade 44 remains fixed and constant throughout the cutting stroke. Although it is preferred to have the knife blade 42 lead the saw blade 44 in its cut through roll R for many materials, the machine of the present invention can also operate with both knife blade 42 and saw blade 44 cutting at the same point or with the saw blade 44 leading the knife blade 42. The difference in operation can be accomplished by simply moving the relative position of the blades 42, 44 on the carriage 36 by use of one or more conventional eccentric mounts for those blades in their respective arms 38, 40 in the carriage 36. When it is desired to have one blade lead the other the desired result is obtained by a lead of as little as approximately 0.025 to 0.060 inches or more depending on the thickness of the web material.

It will be necessary to sharpen knife blade 42 periodically, although the amount of time between sharpenings is significantly increased by the use of the separate core cutting blade 68. It can be expected that the outside diameter of blade 42 will become slightly reduced as a result of the sharpening. Subsequent to sharpening, it may be necessary to adjust the mounting position of one or both blades relative to roll R to compensate for the wear of the knife blade. Such adjustment can be by any conventional means such as an eccentric located on the upper support arm 38 in association with the mounting of knife blade 42 thereto. Compensation for wear of the saw blade 44 or an offsetting compensation for movement of the knife blade 42 can be accomplished in a similar, conventional manner.

Referring to FIG. 5, knife blade 42 is double edged of conventional construction and has hollow ground outer surfaces 42a, 42b. When knife blade 42 leads saw blade 44, the knife blade performs the primary cutting function and saw blade 44 is utilized to remove the material between the double edged portion of knife blade 42. Since knife blade 42 is driven by roll R and it is therefore rotating at the same circumferential speed as the point of contact between knife blade 42 and roll R, little heat is generated by the primary cutting operation. Such manner of operation is particularly advantageous when the web material on roll R is fusible at relatively low temperatures.

FIG. 6 shows the position of knife blade 42, saw blade 44 and core cutting blade 68 at the end of the cutting stroke of carriage 36. In such position knife blade 42 has completely cut through the material on roll R and saw blade 44 has removed all the material from the newly cut groove G. Additionally, core cutting blade 68 has been driven through the core C by carriage 36 (not shown). To facilitate the cutting action of the core cutting blade 68, supporting shaft or mandrel 20 contains an outer sleeve of teflon 74. The teflon sleeve 74 prevents scoring of supporting shaft 20 and prolongs the life of core cutting blade 68 while providing a bearing surface against which core cutting blade 68 can act for a cleaner cut. As best shown in FIG. 7, Core cutting blade 68 is shaped with a bevel in one direction only. The single bevel faces the unloading end or the end opposite chuck 26 of machine 10. A single bevel results in a cleaner cut of core C and facilitates the separation of the plural strips or ribbons S.

FIG. 8 shows a detail of the teeth 76 of saw blade 44. As discussed above, saw blade 44 is used primarily for removal of material and therefore is conventionally shaped for such operation using carbide tips for longer life and cleaner operation.

In normal operation knife motor 46 may be utilized to rotate knife blade 42 to substantially the same circumferential speed as the surface of rotating roll R. The carriage transporting cylinder 66 is then activated and knife and saw blades 42, 44 in carriage 36 are caused to come into contact with the surface of roll R. After contact is made between knife blade 42 and the surface of roll R, the force between the roll R and the blade 42 exerted by carriage transporting cylinder 66 will provide sufficient force to drive knife blade 42 at the same linear speed as the web being cut. After contact is made, first motor 46 can be deactivated manually or by a torque sensing switch (not shown) associated with motor 46.

The embodiment of the present invention disclosed herein has knife blade 42 located on the upper support arm 38 and saw blade 44 located on the lower support arm 40 to facilitate collection of material removed from roll R for recycling. However, it should be understood that the relative orientation of the knife 42 and the saw blades 42, 44 can be reversed. Likewise, knife and saw carriage 36 is depicted as being movable while supporting shaft 20 is fixed. Without departing from the scope of the present invention, carriage 36 may be fixed and supporting shaft 20 and its associated chuck 26 movable relative thereto. Further, supporting shaft or mandrel 20 is shown with its axis in the horizontal direction. It is within the contemplation of the present invention to orient the supporting shaft 20 with its axis in the vertical direction and to orient carriage 36 so that the common plane of rotation of knife and saw blades 42, 44 is horizontal.

Likewise, although the embodiment of the present invention utilizes a core cutting blade that is circular, it is anticipated that any conventional type of cutting blade could be used such as a non-rotating knife or razor blade or a similar cutting means.

Referring to FIG. 2 and the clockwise rotation of the knife and saw blades 42, 44 shown therein, it is possible to reverse the rotation of one or both blades relative to the counterclockwise rotation of roll R. It may be found that slitting of certain web materials on roll R is most advantageously accomplished when one or both knife and saw blades 42, 44 rotate counter to the direction of rotation of the surface of the web material on roll R. Of course, the relative speeds of the knife and saw blades, to each other and to the speed of the roll R, is a matter of choice dictated by the particular material being cut. Those speeds are typically selected on an empirical basis.

Carriage 36 is constructed with upper and lower support arms 38, 40 positioned relative to each other and knife and saw blades 42, 44 so that the distance between the diameter of knife blade 42 and the addendum circle of saw blade 44 preferably is greater than the outside diameter of core C. Thus, as shown in FIG. 6, when carriage 36 is in the core position at the end of the cutting stroke, the knife and saw blades 42, 44 will be above and below core C and the centers of rotation of the blades will be on the vertical centerline of roll R when core cutter blade 68 completes its cut through the core C and assumes the core cutting position. The actual position of knife and saw blades 42, 44 relative to roll R will not be critical as long as there is sufficient clearance to assure that neither blade contacts core C when core cutting blade 68 is in the core cutting position at the full extent of its travel.

When the machine 10 of the present invention is used to cut rolls R of web material on a core C having a diameter greater than the space between the diameter of knife blade 42 and the addendum circle of saw blade 44, the machine 10 is set up to stop the cutting stroke of the carriage 36 short of the point where the knife and saw blades 42, 44 would come into contact with core C. The core cutting blade 68 is adjusted to sever core C and come into contact with teflon sleeve 74 as explained above.

In the present invention, the knife and saw carriage 36 is constructed with upper support arm 38 and lower support arm 40 fixed relative to each other. Such construction provides rigidity and eliminates the possibility of relative motion between the knife and the saw blades 42, 44 which is a source of vibration in a conventional machine incorporating separate movable arms for the blades. Typically, carriage 36 can be made from a one-piece steel weldment of sufficient thickness to exhibit high rigidity.

In the improved machine 10 of the present invention the saw blade 44 removes material from roll R to form groove G. The material is removed in the form of chips or ribbons which, in the case of certain materials such as polyethylene, can be recycled to produce subsequent rolls of web material. In such instances, it is important not to contaminate the removed material with cardboard dust or chips that may result from the cutting of core C by a saw blade. The present invention avoids such contamination by the use of a knife blade which cleanly severs the core without producing cardboard core dust or chips. Additionally, saw blade 44 does not come into contact with core C and there is no likelihood that cardboard dust or chips would be carried by the saw blade into the area where removed material from roll R is collected for recycling. As shown in FIG. 4, material removed from roll R would follow a path substantially tangential from the point of contact between roll R and saw blade 44 where it can be advantageously collected in a vacuum collector or similar device (not shown).

In order to facilitate a more thorough understanding of the present invention, reference will now be made to a typical sequence of cutting roll R on machine 10 of the present invention.

A roll R of web material wound on a hollow core C is placed on the non-rotating supporting shaft or mandrel 20 by the machine operator and engaged within the chuck 26. Mounting cylinder 28 is activated to cause supporting plate 16 to rotate into position and the machine is ready for operation. Carriage 36 is indexed to the appropriate position longitudinally along the machine axis to a first slitting position furthest from the chuck 26. The indexing is accomplished by automatic or manual control of the power lead screw assembly 34 which advances the slitting assembly 30 along side rails 24 on bearings 32 or similar low friction devices. Once the slitting assembly 30 is in the proper position adjacent roll R, the knife and saw variable speed motors 46, 54 are activated causing both the knife blade 42 and saw blade 44 to rotate at the appropriate speed in the proper direction.

In operation, knife blade 42 is driven by knife blade motor 46 to a circumferential speed approximately equal to the surface speed of roll R. Saw blade 44, however, is rotated by the saw blade motor 54 to a speed equal to or greater than the surface speed of roll R. By driving the saw blade slightly higher than the speed of the roll R, it is assumed that the saw blade will cut the removed material into chips, which are easy to handle, rather than ribbons.

After both knife blade 42 and saw blade 44 reach the appropriate speed, the carriage transporting cylinder 66 is activated causing carriage 36 to move transversely to the machine axis along rail 64 until knife blade 42 and/or saw blade 44 engage rotating roll R. At such point knife motor 46 can be de-activated manually or by a torque sensing means associated with the output drive on the knife motor 46 whereby rotation of knife blade 42 is imparted by the engagement of knife 42 with rotating roll R. At all times, saw blade 44 rotates at a speed sufficient to assure that material is removed from roll R in an appropriate form, e.g., chips, ribbons, etc., depending upon the web material. Although saw blade 44 is shown rotating in a direction such that the contacting surfaces are moving in the same relative direction, it should be understood that the machine 10 of the present invention may operate more advantageously on some materials by counter-rotation of the saw blade 44 relative to roll R.

After the initial engagement of the knife blade 42 and saw blade 44 with the material wound around roll R, carriage transporting cylinder 66 continues to extend causing the pair of blades to cut through roll R forming groove G. During the cutting stroke the effective diameter of roll R is decreasing and it is possible to either increase the speed of rotation of roll R or decrease the speed of rotation of saw blade 44 to maintain a substantially constant differential between the circumferential speed of blade 44 and the surface speed of material in roll R at the point of contact with roll R.

Carriage 36 continues to move transversely to the machine axis until approaching a core position where the knife and saw blades 42, 44 are adjacent to the core at the end of the cutting stroke. Prior to assuming the core position at the end of the cutting stroke knife blade 42 and saw blade 44 have cut through substantially all of the material on roll R; however, by virtue of the relationship between the outer diameter of core C and the space between the outer diameter of knife blade 42 and the addendum circle of saw blade 44, neither blade has contacted the core material. As carriage 36 continues to move transversely to reach the core position at the end of the cutting stroke core cutting blade 68 moves into contact with core C and cleanly severs core C by bearing against a teflon sleeve 74 on supporting shaft 20.

When carriage 36 reaches the core position at the end of the cutting stroke, the control means of the machine cause carriage transporting cylinder 66 to restore carriage 36 to the rest position. Slitting assembly 30 is then indexed longitudinally, parallel to the machine axis to the next cutting position, and the operation is repeated.

When the entire roll R is cut into plural strips or ribbons S, operation of the machine is stopped, mounting cylinder 28 is retracted causing supporting plate 16 to rotate away from the free end of supporting shaft 20, and the plurality of side by side strips or ribbons S can be removed from supporting shaft 20.

A latitude of modification, change and substitution is intended in the foregoing disclosure and in some instances, some features of the invention will be employed without a corresponding use of other features. Accordingly, it is appropriate that the appendant claims be construed broadly and in a manner consistent with the spirit and scope of the invention herein.

What is claimed is:

1. A method of slitting elongated rolls of web material rolled upon a tubular core comprising the steps of:
   (a) rotating a web of material rolled upon a tubular core about an axis of said core;
   (b) cutting through said web of material with a rotating circular knife blade moving transversely to said axis of said core in a cutting plane;
   (c) simultaneously sawing through said web of material with a powered rotary circular saw blade moving transversely to said axis of said core through a plane common with said cutting plane;
   (d) cutting through said core with a rotating core cutting knife moving through said cutting plane subsequent to said simultaneous cutting and sawing through said web material.

2. The method of claim 1 further including the step of rotating the circular knife blade to a circumferential speed approximately equal to the surface speed of said rotating web of material prior to cutting through said web of material.

3. The method of claim 1 further including the step of rotating the circular knife blade in a direction opposite the direction of rotation of said rotating web of material prior to cutting through said web of material.

4. A machine for slitting elongated rolls of web material rolled upon a tubular core comprising:
   a frame;
   a roll engagement means and means for rotating said roll engagement means mounted at one end of said frame and adapted to engage one end of a roll of web material for rotation; the axis of said roll engagement means defining a machine axis;
   a slitting assembly comprising
      a carriage mounted for movement parallel to the machine axis to a plurality of cutting locations along the length of the roll and mounted for substantially linear movement in a cutting stroke perpendicular to the machine axis;
      a circular knife blade and a circular saw blade each rigidly mounted for rotation in said carriage in a common plane perpendicular to said machine axis and wherein the center to center distance between said circular knife blade and said circular saw blade remains substantially constant during said cutting stroke;
      motor means for rotating said circular saw blade;
      transporting means for moving said carriage through said cutting stroke from a rest position in which said circular blades are spaced away from the roll of material to a core position where said circular blades are adjacent the core of the roll of material; and,
   control means for coordinating the operation of said slitting assembly.

5. The machine as recited in claim 4 further comprising second motor means for independently rotating said circular knife blade and adapted to rotate said circular knife blade at the same or different speed and direction as said circular saw blade.

6. The machine as recited in claim 4 wherein the center of said circular knife blade and the center of said circular saw blade move in substantially straight lines parallel to each other and perpendicular to said machine axis during said cutting stroke.

7. The machine as recited in claim 6 wherein said circular knife blade and said circular saw blade are remote from said core throughout the entire cutting stroke.

8. The machine as recited in claims 6 or 7 wherein said circular knife blade is double edged.

9. The machine is recited in claim 5 further comprising an end support mounted on a portion of the frame removed from the roll engagement means and adapted to support the opposite end of a roll of web material coaxially with said machine axis.

10. The machine as recited in claim 9 further comprising a longitudinal supporting rod extending from said roll engagement means to said end support coaxial with said machine axis adapted to receive and rotatably support said web material rolled on a tubular core.

11. The machine as recited in claim 10 wherein said longitudinal supporting rod includes a concentric outer sleeve of teflon.

12. The machine as recited in claim 4 further comprising a core knife blade mounted in said slitting assembly, movable through a cutting stroke from a first rest position remote from the core to a core cutting position engaged within the core of the roll of web material.

13. The machine as recited in claim 12 wherein said core knife blade is a smooth circular blade adapted to cut said core substantially without the production of dust or chips and mounted for rotation within said carriage.

14. The machine as recited in claim 12 wherein the center of said circular knife blade and the center of said circular saw blade and the center of said circular core knife blade move in substantially straight lines parallel to each other and perpendicular to said machine axis during said cutting stroke.

15. The machine as recited in claim 12 wherein said core knife blade is fixedly mounted to said carriage.

16. The machine as recited in claim 12 wherein said core knife blade is movably mounted to said carriage and further including core knife blade advancing means for moving said core knife blade into engagement within the core of the roll of web material when said carriage is in said core position.

17. The machine as recited in claims 15 or 16 wherein the center of said core knife blade moves in a path radial to said machine axis during said cutting stroke.

18. The machine as recited in claim 4 further comprising means for moving said carriage to a plurality of cutting locations along the length of the roll including carriage mounting means movable parallel to said machine axis and a lead screw assembly mounted to said frame and said carriage rotatably responsive to said control means.

19. The machine as recited in claim 6 further including means on said carriage for adjusting the distance between said circular knife blade and said circular saw blade to compensate for the wear of either of said circular knife blade or said circular saw blade.

20. A machine for slitting elongated rolls of web material rolled upon a tubular core comprising:
   a frame;
   a roll engagement means and means for rotating said roll engagement means mounted at one end of said frame, the axis of said roll engagement means defining the machine axis;
   an end support mounted on a portion of said frame removed from said roll engagement means;
   a non-rotating longitudinal supporting rod extending from said roll engagement means to said end support coaxial to said machine axis adapted to support a roll of web material for rotation about said machine axis;
   a slitting assembly comprising:
      a carriage mounted for movement parallel to said machine axis to a plurality of cutting locations along the length of the roll and mounted for substantially linear movement in a cutting stroke perpendicular to said machine axis;
      a circular double-edged knife blade and a circular saw blade each rigidly mounted for rotation in said carriage in a common plane perpendicular to said machine axis and wherein the center to center distance between said circular double-edged knife blade and said circular saw blade remains substantially constant during said cutting strokes;
      a circular core cutting knife blade mounted on said carriage for rotation in said common plane and for movement in a path radial to said machine axis during said cutting stroke;
      means for rotating said circular saw blade;
      transporting means for moving said carriage through said cutting stroke from a rest position in which said circular blades are spaced away from the roll of material to a core cutting position where said circular double edged knife blade and said circular saw blade are adjacent the core of the roll of material and said circular core cutting knife blade is engaged within the core of said roll and is adjacent said supporting rod; and,
   control means for coordinating the operation of said slitting assembly.

21. The machine as recited in claim 20 further including means associated with said circular core cutting knife for moving said circular cutting knife in a path radial to said machine axis into engagement with said longitudinal supporting rod in the core cutting position substantially independently from said carriage.

22. In a machine for slitting elongated rolls of web material wound on a core having a frame, a roll engagement means and means for rotating said roll engagement means mounted on said frame, the axis of said roll engagement means defining a machine axis and adapted to engage a roll of web material for rotation coaxial with said machine axis and a slitting assembly comprising circular blade means for cutting into a roll of web material engaged by said chuck, and carriage means mounting said circular cutting means for movement to spaced locations parallel to said machine axis and for movement through a cutting stroke perpendicular thereto, the improvement comprising a core knife blade mounted in said slitting assembly movable through a cutting stroke in a path perpendicular to said machine axis and radial thereto from a rest position remote from said roll of web material to a core cutting position wherein said core knife blade is engaged within the core of said roll of web material.

23. The machine recited in claim 22 wherein said core knife blade is a circular blade adapted to cut said core without producing chips or dust.

24. The machine as recited in claim 22 wherein said core knife blade actuating means associated with said slitting assembly is adapted to move said core knife blade in a path radial to said machine axis into engagement within said core during said cutting stroke.

25. In a machine for slitting elongated rolls of web material wound on a core, having a frame, roll engagement and supporting means for supporting and rotating a web of material on a machine axis defined by the axis of said roll supporting and engagement means, power means for rotating said roll of material the improvement comprising cutting means having a first independently operable web cutting blade and a second independently operable core cutting blade wherein said first web cutting blade is movable through a cutting stroke perpendicular to said machine axis from a rest position in which said first web cutting blade is spaced away from the roll of material to a cutting position where said first web cutting blade is engaged within the web.

* * * * *